(12) United States Patent
Karonde et al.

(10) Patent No.: US 8,793,217 B2
(45) Date of Patent: Jul. 29, 2014

(54) BLOCK LEVEL INCREMENTAL BACKUP

(75) Inventors: Pratap Karonde, Holbrook, NY (US); Prashant Parikh, Holtsville, NY (US)

(73) Assignee: CA, Inc., Islandia, NY (US)

( * ) Notice: Subject to any disclaimer, the term of this patent is extended or adjusted under 35 U.S.C. 154(b) by 112 days.

(21) Appl. No.: 12/837,829

(22) Filed: Jul. 16, 2010

(65) Prior Publication Data

US 2012/0016841 A1    Jan. 19, 2012

(51) Int. Cl.
    *G06F 7/00*     (2006.01)
    *G06F 17/00*     (2006.01)

(52) U.S. Cl.
    USPC ........................................................ 707/646

(58) Field of Classification Search
    USPC ........................................................ 707/646
    See application file for complete search history.

(56) References Cited

U.S. PATENT DOCUMENTS

| | | | |
|---|---|---|---|
| 5,163,148 A | 11/1992 | Walls | |
| 6,785,786 B1 * | 8/2004 | Gold et al. | 711/162 |
| 6,799,189 B2 | 9/2004 | Huxoll | |
| 7,069,402 B2 | 6/2006 | Coulter et al. | |
| 7,197,665 B2 | 3/2007 | Goldstein et al. | |
| 7,266,574 B1 | 9/2007 | Boudrie et al. | |
| 7,797,279 B1 * | 9/2010 | Starling et al. | 707/641 |
| 7,934,064 B1 * | 4/2011 | Per et al. | 711/161 |
| 8,037,032 B2 * | 10/2011 | Pershin et al. | 707/681 |
| 8,051,044 B1 * | 11/2011 | Dyatlov et al. | 707/646 |
| 8,069,320 B1 * | 11/2011 | Per et al. | 711/161 |
| 8,190,574 B2 * | 5/2012 | Barnes et al. | 707/646 |
| 2003/0200480 A1 * | 10/2003 | Beattie | 714/13 |
| 2004/0268068 A1 * | 12/2004 | Curran et al. | 711/162 |
| 2007/0083722 A1 * | 4/2007 | Per et al. | 711/162 |
| 2007/0112895 A1 | 5/2007 | Ahrens et al. | |
| 2007/0276885 A1 * | 11/2007 | Valiyaparambil et al. | 707/204 |
| 2008/0126722 A1 | 5/2008 | Korlepara | |
| 2008/0133613 A1 | 6/2008 | Werner et al. | |
| 2008/0275923 A1 * | 11/2008 | Haselton et al. | 707/204 |
| 2009/0307286 A1 * | 12/2009 | Laffin | 707/204 |
| 2010/0076934 A1 | 3/2010 | Pershin et al. | |
| 2010/0280994 A1 * | 11/2010 | Radon et al. | 707/644 |
| 2010/0299312 A1 | 11/2010 | Suryanarayanan et al. | |
| 2011/0218966 A1 * | 9/2011 | Barnes et al. | 707/645 |
| 2012/0084258 A1 | 4/2012 | Karonde et al. | |

OTHER PUBLICATIONS

U.S. Appl. No. 12/897,473, Examiner Interview Summary mailed May 2, 2013, 3 pgs.
U.S. Appl. No. 12/897,473, Examiner Interview Summary mailed Nov. 8, 2012, 3 pgs.
U.S. Appl. No. 12/897,473, Final Office Action mailed Aug. 6, 2012, 12 pgs.
U.S. Appl. No. 12/897,473, Non Final Office Action mailed Jan. 17, 2013, 9 pgs.
U.S. Appl. No. 12/897,473, Non Final Office Action mailed Feb. 29, 2012, 7 pgs.

(Continued)

*Primary Examiner* — Robert Beausoliel, Jr.
*Assistant Examiner* — Michael Pham
(74) *Attorney, Agent, or Firm* — Schwegman, Lundberg & Woessner, P.A.

(57) ABSTRACT

A system and method include creating a full backup copy of selected data from a storage device. A series of incremental backups are created over time following the creation of the full backup copy. The oldest incremental backup is merged into the full backup at a desired time.

27 Claims, 6 Drawing Sheets

(56) References Cited

OTHER PUBLICATIONS

U.S. Appl. No. 12/897,473, Response filed May 29, 2012 to Non Final Office Action mailed Feb. 29, 2012, 9 pgs.

U.S. Appl. No. 12/897,473, Response filed Dec. 5, 2012 to Final Office Action mailed Aug. 6, 2012, 8 pgs.

"U.S. Appl. No. 12/897,473 , Response filed May 15, 2013 to Non Final Office Action mailed Jan. 17, 2013", 7 pgs.

"U.S. Appl. No. 12/897,473 , Response filed Nov. 1, 2013 to Final Office Action mailed Aug. 2, 2013", 8 pgs.

"U.S. Appl. No. 12/897,473, Examiner Interview Summary mailed Sep. 19, 2013", 3 pgs.

"U.S. Appl. No. 12/897,473, Final Office Action mailed Aug. 2, 2013", 9 pgs.

\* cited by examiner

BLOCK LEVEL INCREMENTAL BACKUP

BACKGROUND

In an incremental backup, a file is generated that includes all blocks of data from a storage device to be backed up. Further backups may be performed by storing only blocks that changed from that last backup. Such backups are referred to as incremental backups. To restore data from a storage device that has failed, the original backup is used, and all the incremental backups are then applied to changed blocks to obtain the latest file. As the number of incremental backups grows larger, the recovery time to obtain a desired file increases. To reduce the recovery time, another full backup is forced. Forcing another full backup consumes significant storage space and can also take a significant amount of time.

SUMMARY

A method includes creating a full backup copy of selected data from a storage device. A series of incremental backups are created over time following the creation of the full backup copy. The oldest incremental backup is merged into the full backup at a desired time.

In one embodiment, a method includes creating a full backup copy of compressed blocks of data from a storage device. A series of incremental backups is created corresponding to blocks of data that have changed over time following the creation of the full backup copy. Blocks of the oldest incremental backup are merged into corresponding blocks of the full backup at a desired time.

In a further embodiment, a computer readable storage device has instructions to cause a computer to implement a method including creating a full backup copy of selected data from a storage device, creating a series of incremental backups over time following the creation of the full backup copy, and merging the oldest incremental backup into the full backup at a desired time.

In yet a further embodiment, a system includes a module to execute on the system to create a full backup copy of selected data from a storage device, a module to execute on the system to create a series of incremental backups over time following the creation of the full backup copy, and a module to execute on the system to merge the oldest incremental backup into the full backup at a desired time.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

Figure 1:
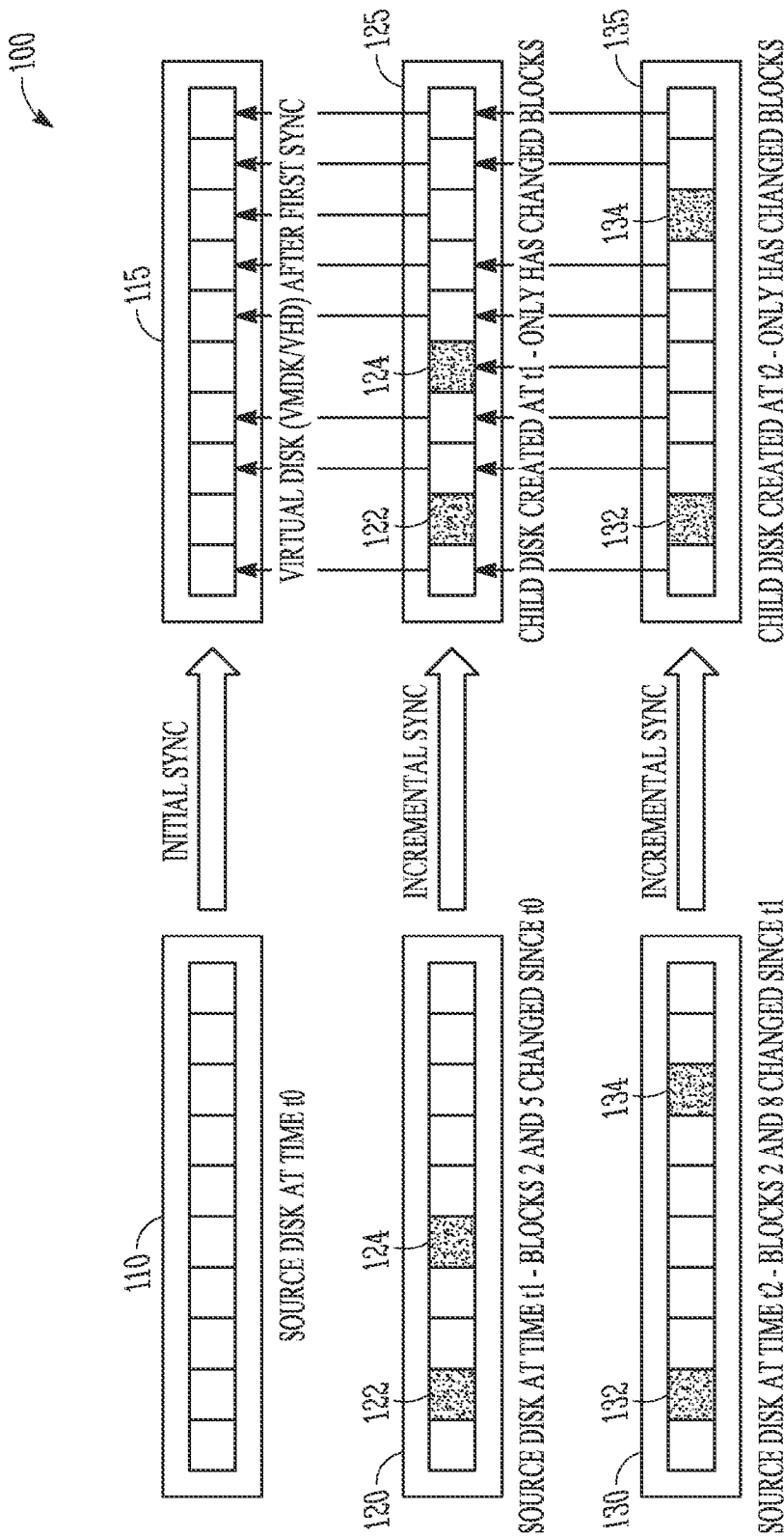
FIG. 1 is a diagram illustrating multiple backups of selected data over time according to an example embodiment.

FIG. 1 is a diagram illustrating at 100, multiple backups of selected data over time according to an example embodiment. A bock representation of a data storage device at a time T0 is indicated at 110. Ten blocks are shown as representing data stored on the data storage device 110. In one embodiment, data stored on the storage device 110 is broken into blocks as shown. Portions of the storage device 110 that do not currently have data need not have a corresponding block. An initial full backup of the blocks is performed and results in a backup copy 115 of the blocks, which may be stored on a virtual disk, or any other type of container or storage device, such as a disk drive. All ten blocks are stored in full backup copy 115. The initial backup may be referred to as an initial sync in one embodiment.

At a time T1, storage device 110 may be modified as shown at 120. Blocks 122 and 124, the second and fifth blocks may be changed from time T0. An incremental sync or backup is then performed, resulting in blocks 122 and 124 being stored as indicated at incremental backup 125. The same container or storage device used for backup copy 115 may also be used for incremental backups. The remaining blocks need not be stored in incremental backup 125, because they remain the same as stored in full backup copy 115.

At a time T2, more blocks of storage device 110 may have been modified as shown at 130. Blocks 132 and 134, corresponding to the second and eighth blocks have been modified. The second block was modified both by times T1 and T2. Both blocks 132 and 134 are stored in a further incremental backup 135. The other, unmodified blocks need not stored in incremental backup 135. Note that several blocks have not been modified yet, and are thus not included in the incremental backups 125 and 135. Many more incremental backups may be performed at set times or as otherwise desired.

At some point, to reduce the number of incremental backups that must be processed to recover data, the two oldest backups, 115 and 125 may be merged. This results in block 122 in backup 125 being stored over the second block in backup 115, and block 124 in backup 125 being stored over the fifth block in backup 115. The overall number of backups is reduced by as a result of the merge, making recovery shorter, as fewer backups need to be processed to recover data.

Figure 2:
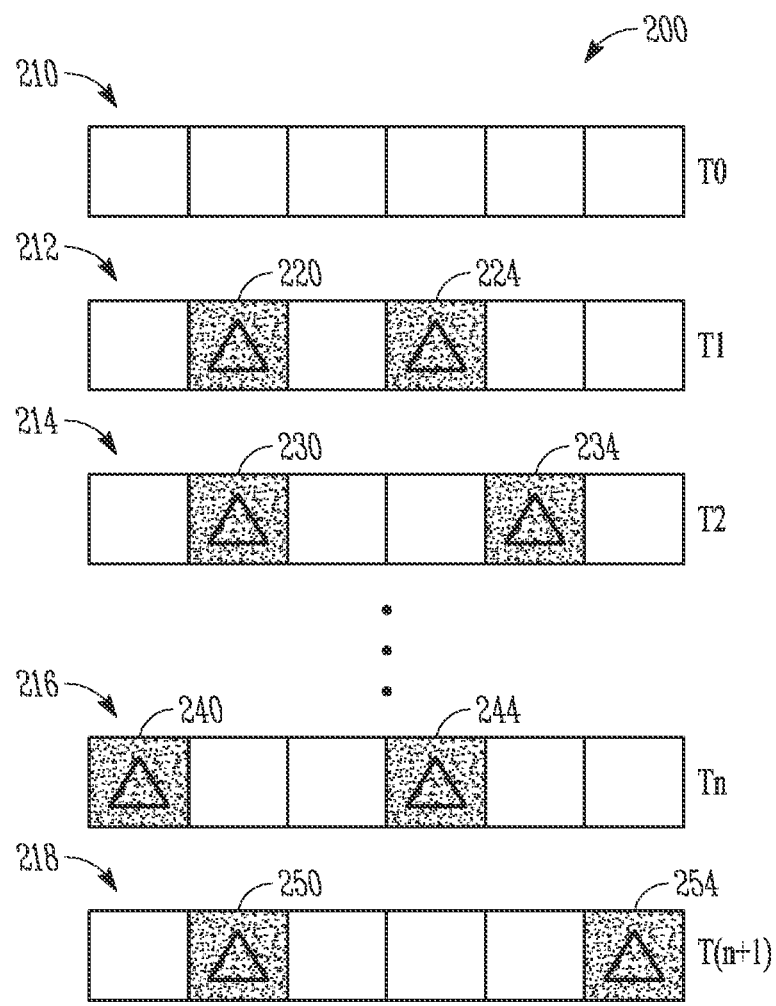
FIG. 2 is a flowchart illustrating a process of making multiple incremental backups over time according to an example embodiment.

FIG. 2 is a diagram illustrating at 200, multiple backups of selected data over time according to an example embodiment.

A bock representation of a full backup of blocks of data storage device at a time T0 is indicated at 210, and successive incremental backups are shown at 212 for time T1, 214 for time T2, 216 for time Tn, and 218 for time T(n+1). In one embodiment, only changed blocks in the incremental backups are saved. The changed blocks are indicated at 220 and 224 for incremental backup 212, 230 and 234 for incremental backup 214, 240 and 244 for incremental backup 216, and 250 and 254 for incremental backup 218.

In one embodiment, n incremental backups are kept. When incremental backup 218 is made or is scheduled to be made, the changed blocks 220 and 224 of incremental backup 212 are merged into the full backup 210, replacing corresponding blocks. The merging of the two oldest backups, 210 and 212 ensure that at most only n backups need be merged to recover data prior to a next backup. When incremental backup at time T(n+2) is to be performed, incremental backup 214 from time T2 may be merged into full backup 210, maintaining the number of backups at n. This process may continue ad infinitum, without the need to make a second full backup, saving storage space, and recovery time.

As one example, consider that the storage device needs to be recovered after time T(n+1). With the previous merger of incremental backup 212, only n backups need to be processed to recover data that had been stored on the storage device. At time T(n+m), the mergers reduce by m the number of backups to be processed to recover the data. Over time, m, can be very large, such 1000 or more if backups are scheduled periodically. In some embodiments, scheduled backups may be set by users, and may be performed several times week, day or hour as desired, resulting in very large numbers of incremental backups if merges are not performed. However, mergers help keep the number of backups to be processed to recover data to a manageable number.

In some embodiments, rather than a fixed number, n, of incremental backups being kept, backups may instead be merged based on time periods. For instance, a user may desire to keep all incremental backups for a period of a week, or some other user selected period. Rather than merging the oldest two backups, intermediate incremental backups may be merged, such as to merge daily backups into weekly backups that may be kept for a longer period of time. Regardless of the incremental backup rate, incremental backups may be merged when they are older than the selected period. They may be merged in batch, so that they may occur at slow periods, such as late evenings or early mornings in one embodiment, or individually as the selected period for each incremental backup is past.

Figure 3:
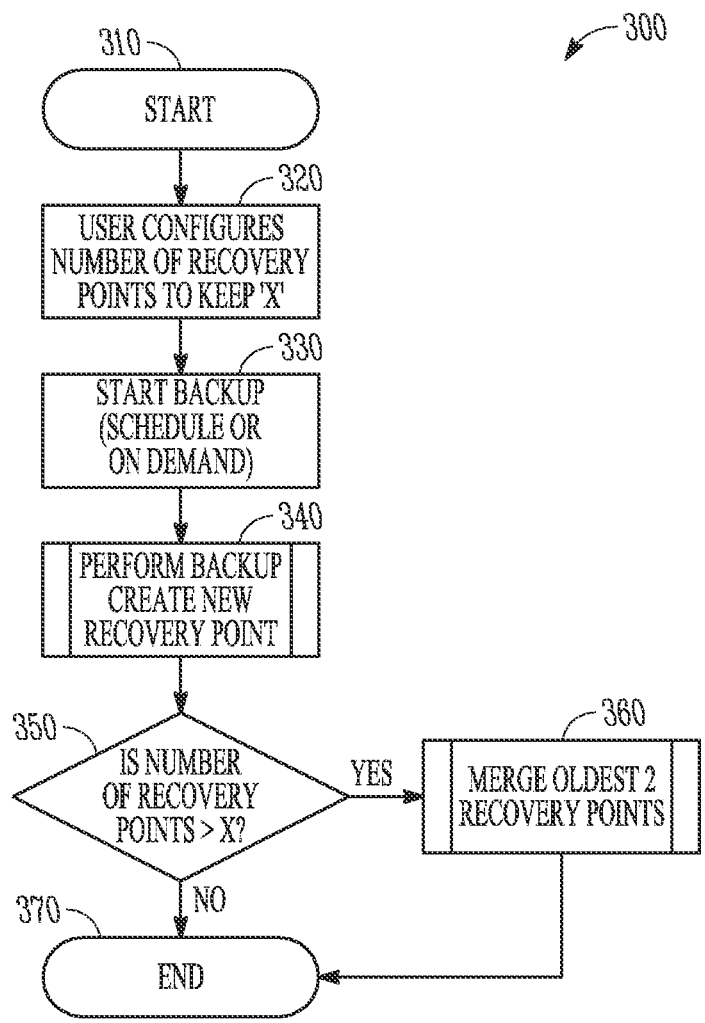
FIG. 3 is a flowchart illustrating a computer implemented process for backing up data according to an example embodiment.

FIG. 3 is a flowchart illustrating a computer implemented process 300 for backing up data. At 310, the process 300 starts. The process may be set up on a new computer system or an older computer system, and operates to backup data stored on one or more storage devices to allow users to recover data that may be lost due to equipment failure or other event leading to data loss.

At 320, a user configures the number of recovery points, x, to keep. The number may be a default number set by a manufacturer, or may be selected to allow recovery to selected points within a desired time frame, such as a few days or weeks, or even minutes depending on the frequency of backups and the application being implemented by the computer system. Once the number of recovery points is selected backups may be started as indicated at 330. Backups may be scheduled periodically, or on demand, or a combination of both.

At 340, a backup is performed, creating a new recovery point. The initial backup is referred to as the oldest recovery point, with subsequent backups being referred to as incremental recovery points. At 350, the number of recovery points is checked to see if it is greater than x. If so, the oldest two recovery points are merged at 360, creating an updated oldest recovery point. The process 300 ends at 370.

Figure 4:
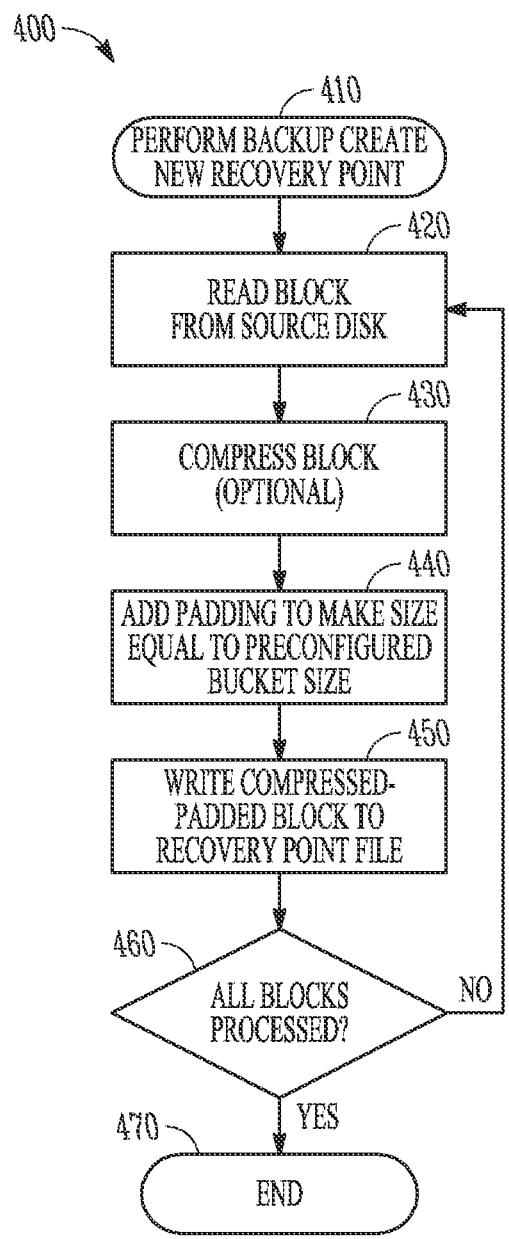
FIG. 4 is a flowchart illustrating a process of creating a new or first recovery point according to an example embodiment.

FIG. 4 is a flowchart illustrating a process 400 of creating a new or first recovery point. At 410, a backup is initiated to create a new recovery point. At 420, a block from a source storage device, such as a disk of a disk drive device is read. At 430, the block may be optionally compressed. At 440, some padding is added to the block to make the size of the block equal to a preconfigured bucket size or one of several preconfigured sizes. At 450, the padded block, or padded compressed block is written to a recovery point file on a backup storage system, such as different disk drives, tape drives, optical, or other type of storage. At 460, it is determined whether all the blocks have been processed. If not, the next block is read at 420, and the process 400 continues. If all blocks have been processed, process 400 ends at 470.

Figure 5:
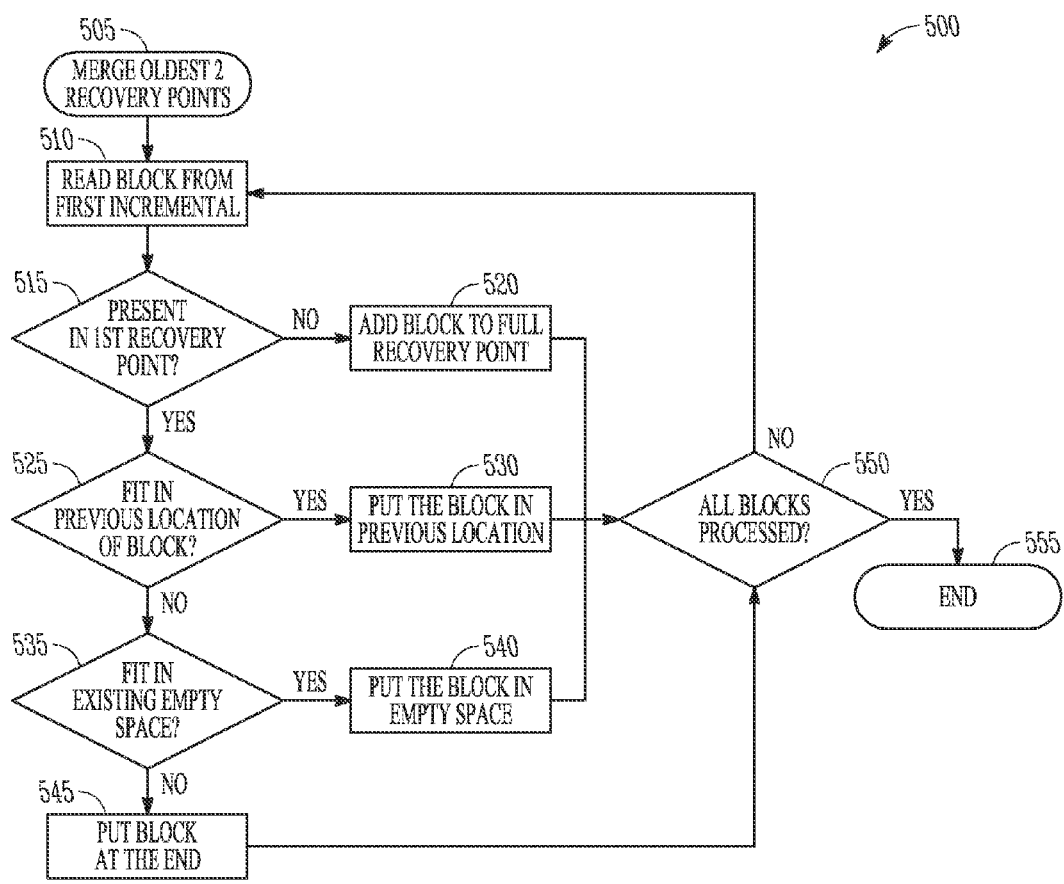
FIG. 5 is a flowchart illustrating a process for merging recovery points according to an example embodiment.

FIG. 5 is a flowchart illustrating a process 500 for merging recovery points. At 505, the process to merge the oldest two recovery points begins. At 510, a block is read from the first incremental recovery point. At 515, a check is made to see if the read block is present in the oldest, first recovery point. If not, the read block is added to a full recovery point at 520. If the read block was present, a check is made at 525 to determine if the read block will fit in the previous location of the block in the first recovery point. The padding provides some buffer to increase the likelihood that the read block will fit, even if the data in the block has been significantly changed. If it will fit, the block is put into the previous location at 530, if not, a check is made to see if the read block will fit in existing empty space at 535. If the block will fit in existing empty space, the block is put into the empty space at 540. If not, the block may be added to the end of the recovery point at 545. After the read block is stored at 520, 530, or 540, a check is made to see if all blocks have been processed at 550. If not, the merger process proceeds at 510 by reading a next block. If all blocks have been processed, the merge process 500 ends at 555.

Figure 6:
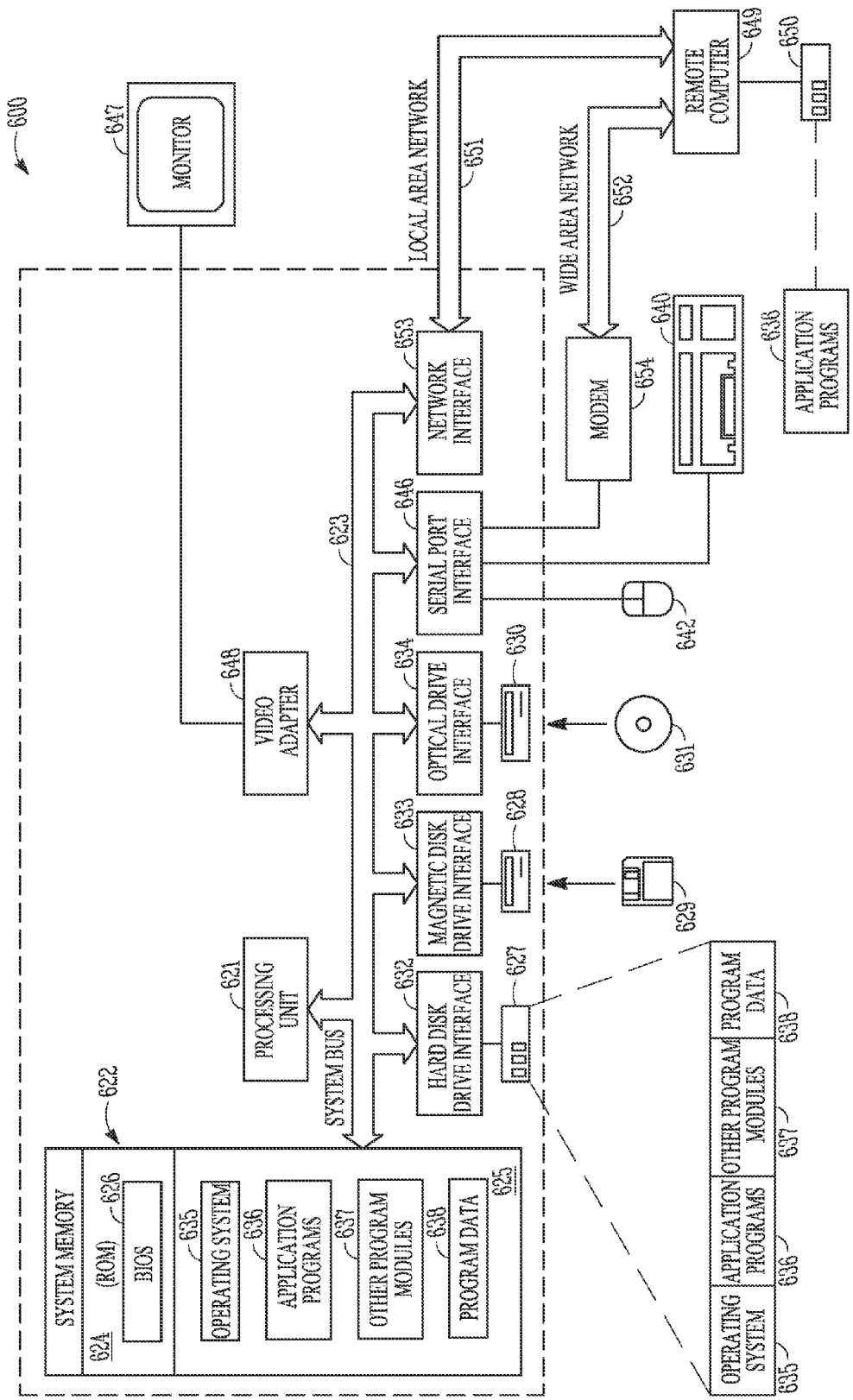
FIG. 6 is a block diagram illustrating a computer system for implementing and full backup and multiple incremental backups according to an example embodiment.

In the embodiment shown in FIG. 6, a hardware and operating environment is provided that is applicable to any of the servers and/or remote clients shown in the other Figures.

As shown in FIG. 6, one embodiment of the hardware and operating environment includes a general purpose computing device in the form of a computer 600 (e.g., a personal computer, workstation, or server), including one or more processing units 621, a system memory 622, and a system bus 623 that operatively couples various system components including the system memory 622 to the processing unit 621. There may be only one or there may be more than one processing unit 621, such that the processor of computer 600 comprises a single central-processing unit (CPU), or a plurality of processing units, commonly referred to as a multiprocessor or parallel-processor environment. In various embodiments, computer 600 is a conventional computer, a distributed computer, or any other type of computer.

The system bus 623 can be any of several types of bus structures including a memory bus or memory controller, a peripheral bus, and a local bus using any of a variety of bus architectures. The system memory can also be referred to as simply the memory, and, in some embodiments, includes read-only memory (ROM) 624 and random-access memory (RAM) 625. A basic input/output system (BIOS) program 626, containing the basic routines that help to transfer information between elements within the computer 600, such as during start-up, may be stored in ROM 624. The computer 600 further includes a hard disk drive 627 for reading from and writing to a hard disk, not shown, a magnetic disk drive 628 for reading from or writing to a removable magnetic disk 629, and an optical disk drive 630 for reading from or writing to a removable optical disk 631 such as a CD ROM or other optical media.

The hard disk drive 627, magnetic disk drive 628, and optical disk drive 630 couple with a hard disk drive interface 632, a magnetic disk drive interface 633, and an optical disk drive interface 634, respectively. The drives and their associated computer-readable media provide non volatile storage of computer-readable instructions, data structures, program modules and other data for the computer 600. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 629, optical disk 631, ROM 624, or RAM 625, including an operating system 635, one or more application programs 636, other program modules 637, and program data 638. Programming for implementing one or more processes or method described herein may be resident on any one or number of these computer-readable media.

A user may enter commands and information into computer 600 through input devices such as a keyboard 640 and pointing device 642. Other input devices (not shown) can include a microphone, joystick, game pad, satellite dish, scanner, or the like. These other input devices are often connected to the processing unit 621 through a serial port interface 646 that is coupled to the system bus 623, but can be connected by other interfaces, such as a parallel port, game port, or a universal serial bus (USB). A monitor 647 or other type of display device can also be connected to the system bus 623 via an interface, such as a video adapter 648. The monitor 647 can display a graphical user interface for the user. In addition to the monitor 647, computers typically include other peripheral output devices (not shown), such as speakers and printers.

The computer 600 may operate in a networked environment using logical connections to one or more remote computers or servers, such as remote computer 649. These logical connections are achieved by a communication device coupled to or a part of the computer 600; the invention is not limited to a particular type of communications device. The remote computer 649 can be another computer, a server, a router, a network PC, a client, a peer device or other common network node, and typically includes many or all of the elements described above I/O relative to the computer 600, although only a memory storage device 650 has been illustrated. The logical connections depicted in FIG. 6 include a local area network (LAN) 651 and/or a wide area network (WAN) 652. Such networking environments are commonplace in office networks, enterprise-wide computer networks, intranets and the internet, which are all types of networks.

When used in a LAN-networking environment, the computer 600 is connected to the LAN 651 through a network interface or adapter 653, which is one type of communications device. In some embodiments, when used in a WAN-networking environment, the computer 600 typically includes a modem 654 (another type of communications device) or any other type of communications device, e.g., a wireless transceiver, for establishing communications over the wide-area network 652, such as the internet. The modem 654, which may be internal or external, is connected to the system bus 623 via the serial port interface 646. In a networked environment, program modules depicted relative to the computer 600 can be stored in the remote memory storage device 650 of remote computer, or server 649. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

The Abstract is provided to comply with 37 C.F.R. §1.72(b) is submitted with the understanding that it will not be used to interpret or limit the scope or meaning of the claims.

The invention claimed is:

1. A method comprising:
    creating a full backup copy of selected data from a storage device;
    creating a series of incremental backups over time following the creation of the full backup copy, including creating an oldest incremental backup at a first time, a second incremental backup at a second time, and a newest incremental backup at a third time, the second time occurring after the oldest incremental backup is created, and the third time occurring after the second incremental backup is created;
    merging the second incremental backup into the oldest incremental backup when a number of incremental backups in the series of incremental backups exceeds a specified number of incremental backups so as to retain at most a maximum number of incremental backups in the series of incremental backups; and
    merging the oldest incremental backup into the full backup at a selected time while not merging the newest incremental backup into the full backup, wherein merging the oldest incremental backup into the full backup comprises:
        reading a block of data from the oldest incremental backup;
        determining whether the block of data is present in the full backup;
        in response to determining the block of data is present in the full backup, then determining whether the block of data fits in a previous location of the block of data in the full backup; and
        in response to determining the block of data is not present in the full backup, then adding the block of data to the full backup.

2. The method of claim 1 wherein the selected data comprises blocks of data and an incremental backup of the series of incremental backups includes blocks of the data that have changed since a last backup.

3. The method of claim 2 wherein the selected time corresponds to existence of a selected number of incremental backups in the series of incremental backups being greater than the number of incremental backups in the series of incremental backups to be merged into the full backup.

4. The method of claim 3 wherein incremental backups of the series of incremental backups are created at scheduled times.

5. The method of claim 2 wherein the selected time corresponds to a predetermined time.

6. The method of claim 4 wherein multiple oldest incremental backups are merged into the full backup at each scheduled time.

7. The method of claim 6 wherein the multiple oldest incremental backups include a number of incremental backups occurring between consecutive scheduled times.

8. The method of claim 1 wherein merging the oldest incremental backup into the full backup includes replacing blocks of data in the full backup with changed blocks from the oldest incremental backup.

9. A method comprising:
creating a full backup copy of compressed blocks of data from a storage device;
creating a series of incremental backups corresponding to blocks of data that have changed over time following the creation of the full backup copy, including creating an oldest incremental backup created at a first time after the creation of the full backup copy, a second incremental backup at a second time after the creation of the full backup copy, and a newest incremental backup created at a third time after the creation of the full backup copy, the second time after the creation of the oldest incremental backup and the third time after creation of the second incremental backup;
merging the second incremental backup into the oldest incremental backup when a number of incremental backups in the series of incremental backups exceeds a specified number of incremental backups so as to retain at most a maximum number of incremental backups in the series of incremental backups; and
merging blocks of data of the oldest incremental backup into corresponding blocks of data of the full backup at a selected time to reduce the number of incremental backups that have not been applied while not merging the newest incremental backup into the full backup copy, wherein merging blocks of the oldest incremental backup into corresponding blocks of the full backup comprises:
reading a block of data of the blocks of data from the oldest incremental backup;
determining whether the block of data is present in the full backup;
in response to determining the block of data is present in the full backup, determining whether the block of data fits in a previous location of the block of data in the full backup; and
in response to determining the block of data is not present in the full backup, adding the block of data to the full backup.

10. The method of claim 9 wherein blocks of the full backup copy include padding to allow for increased block size from merged blocks from incremental backups of the series of incremental backups.

11. The method of claim 9 and further comprising compressing blocks of data in incremental backups of the series of incremental backups.

12. The method of claim 9 wherein the full backup copy and incremental backups of the series of incremental backups are stored on a virtual disk.

13. The method of claim 9 wherein only one full backup copy is made without the need for a further full backup copy at any time.

14. The method of claim 9 wherein the selected time corresponds to existence of a selected number of incremental backups in the series of incremental backups.

15. The method of claim 14 wherein incremental backups of the series of incremental backups are created at scheduled times.

16. The method of claim 9 wherein the selected time corresponds to a predetermined time.

17. The method of claim 9 wherein merging the oldest incremental backup into the full backup includes replacing blocks of data in the full backup with changed blocks from the oldest incremental backup.

18. A non-transitory computer readable storage device having instructions stored thereon to cause a computer to implement a method comprising:
creating a full backup copy of selected data from a storage device;
creating a series of incremental backups over time following the creation of the full backup copy, including creating an oldest incremental backup at a first time, a second incremental backup at a second time, and a newest incremental backup at a third time, the second time occurring at a time after the creation of the oldest incremental backup, and the third time occurring at a time after the creation of the second incremental backup;
merging the second incremental backup into the oldest incremental backup when a number of incremental backups in the series of incremental backups exceeds a specified number of incremental backups so as to retain at most a maximum number of incremental backups in the series of incremental backups; and
merging the oldest incremental backup into the full backup at a selected time to reduce the number of incremental backups that have not been applied, while not merging the newest incremental backup into the full backup copy, wherein merging the oldest incremental backup into the full backup comprises:
reading a block of data from the oldest incremental backup;
determining whether the block of data is present in the full backup;
in response to determining the block of data is present in the full backup, determining whether the block of data fits in a previous location of the block of data in the full backup; and
in response to determining the block of data is not present in the full backup, adding the block of data to the full backup.

19. The non-transitory computer readable storage device of claim 18 wherein the selected data comprises blocks of data and an incremental backup of the series of incremental backups includes blocks of the data that have changed since the last backup.

20. The non-transitory computer readable storage device of claim 19 wherein the selected time corresponds to existence of a selected number of incremental backups in the series of incremental backups.

21. The non-transitory computer readable storage device of claim 20 wherein incremental backups of the series of incremental backups are created at scheduled times.

22. The non-transitory computer readable storage device of claim 20 wherein the blocks are compressed and include padding in the full backup copy.

23. A system for creating a backup of data comprising:
one or more computer processors;
a module to execute on the one or more computer processors to create a full backup copy of selected data from a storage device;
a module to execute on the one or more computer processors to create a series of incremental backups over time following the creation of the full backup copy including creating an oldest incremental backup at a first time and a newest incremental backup at a second time, the second time after the creation of the oldest incremental backup; and a module to execute on the computer processors to merge the oldest incremental backup into the full backup at a desired time to reduce the number of incremental backups that have not been applied, while not merging the newest incremental backup into the full backup, wherein merging blocks of the oldest incremental backup into corresponding blocks of the full backup comprises:

reading a block of data from the oldest incremental backup;

determining whether the block of data is present in the full backup;

in response to determining the block of data is present in the full backup, determining whether the block of data fits in a previous location of the block of data in the full backup; and in response to determining the block of data is not present in the full backup, adding the block of data to the full backup.

24. The system of claim 23 wherein the full backup copy includes compressed blocks of data and each incremental backup of the series of incremental backups includes a block of data that has changed since a last backup, and wherein the series of incremental backups and the full backup copy are stored on a virtual disk device.

25. The system of claim 24 and further comprising a module to execute on the system to construct a full copy of the selected data that includes all changes to all blocks.

26. The method of claim 1, further comprising:
in response to determining the block of data does not fit in the previous location of the block of data in the full backup, then determining whether the block of data fits in an existing empty space in the full backup; and
in response to determining the block of data does fit in the previous location of the block of data in the full backup, then putting the block of data in the previous location of the block of data in the full backup.

27. The method of claim 26, further comprising:
in response to determining the block of data does not fit in the existing empty space in the full backup, then putting the block of data at the end of the full backup; and
in response to determining the block of data does fit in the existing empty space in the full backup, then putting the block of data in the empty space in the full backup.

* * * * *